Jan. 30, 1934.  J. M. AUFIERO  1,945,252
HEATER
Filed Oct. 8, 1931   2 Sheets-Sheet 1

INVENTOR
JOHN M. AUFIERO,
BY
Duell, Dunn & Anderson
ATTORNEYS

Jan. 30, 1934.     J. M. AUFIERO     1,945,252
HEATER
Filed Oct. 8, 1931     2 Sheets-Sheet 2
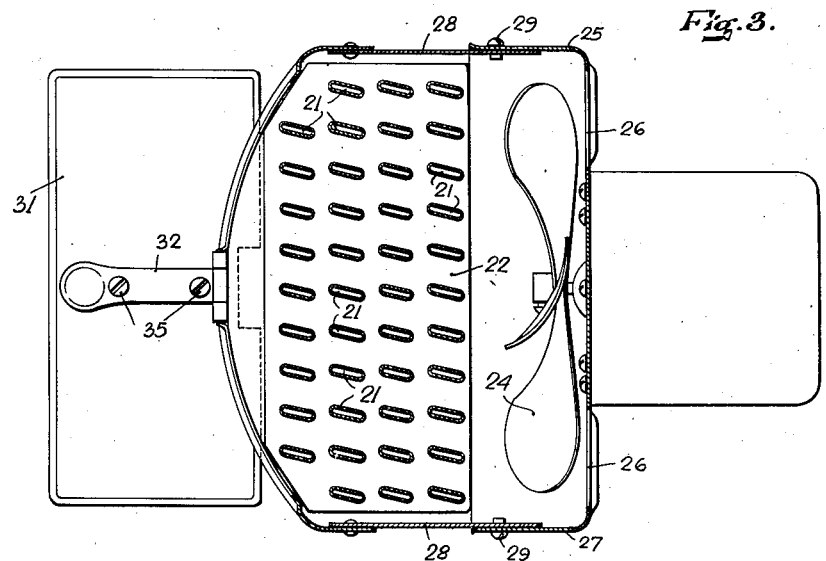
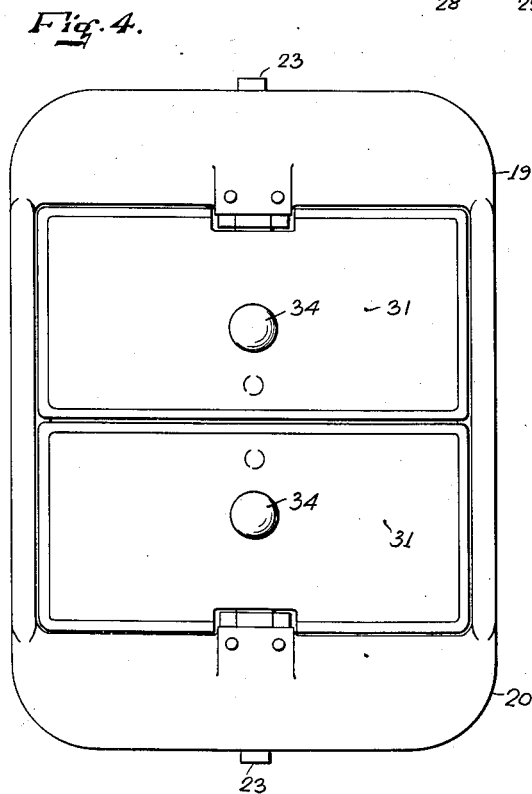
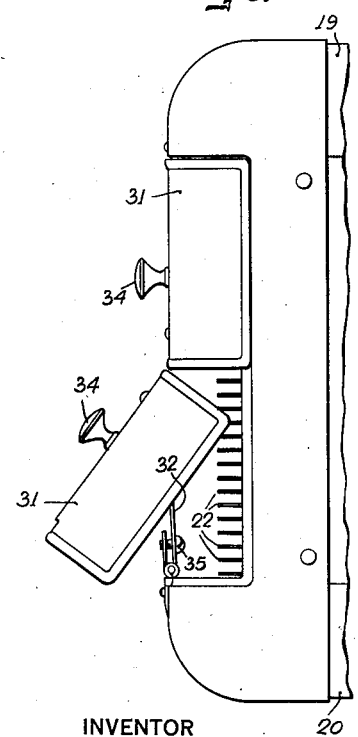
INVENTOR
JOHN M. AUFIERO,
BY
ATTORNEYS Patented Jan. 30, 1934

1,945,252

UNITED STATES PATENT OFFICE 1,945,252

HEATER

John M. Aufiero, Brooklyn, N. Y., assignor to E. A. Laboratories, Inc., Brooklyn, N. Y., a corporation of New York Application October 8, 1931. Serial No. 567,646

7 Claims. (Cl. 257—137)

This invention relates to a functionally and structurally improved heater and in its more specific aspects aims to provide an apparatus of this character primarily intended for use in connection with automotive vehicles for the purpose of heating the same.

It is an object of the invention to construct a heater which will efficiently heat the interior of a motor vehicle and by means of which moreover the generated heat may be efficiently distributed to any desired point.

A further object of this invention is that of furnishing an apparatus which may be economically and efficiently installed in motor vehicles at the time of their construction or which apparatus may, with facility, be applied to a motor vehicle in which no provision has heretofore been made for a heater.

An additional object is that of furnishing an apparatus of this character which will embody relatively few parts, each individually simple and rugged in construction and capable of manufacture largely by automatic machinery, these parts being suited for assemblage by relatively unskilled labor to provide a unitary apparatus operating over long periods of time with freedom from difficulties.

With these and other objects in mind, reference is had to the attached sheets of drawings, illustrating one practical embodiment of the invention, and of which:

Fig. 3 is a sectional plan view thereof;

Fig. 4 is a front view of the heater, and

Fig. 5 is a fragmentary side elevation of the apparatus.

Figure 1:
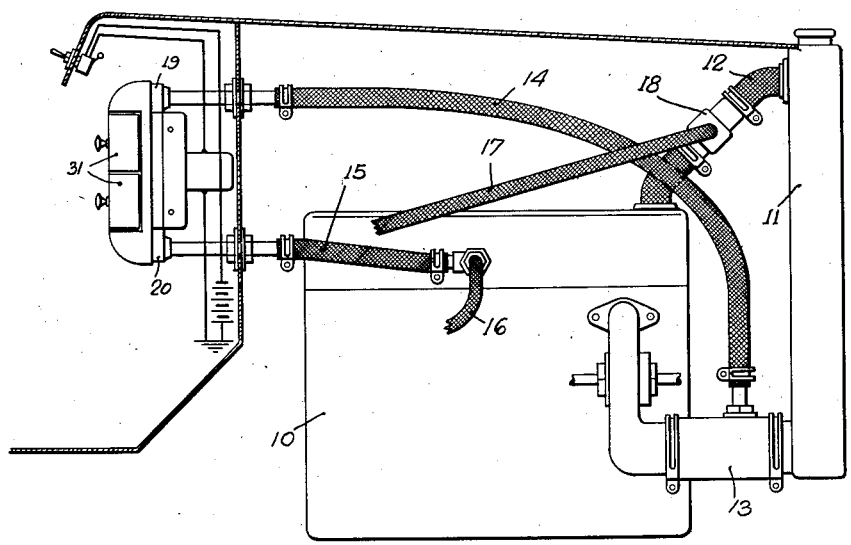
Figure 1 is a partially sectional side view of the front end of a motor vehicle, and showing the heater in installed position therein.

In these views—referring primarily to Fig. 1— the numeral 10 indicates an internal combustion motor to which a cooling radiator 11 is coupled by, for example, hose connections 12 and 13. According to the preferred manner of installing the heater on automobiles of most types, the connection 13 is tapped and coupled to one end of a hose 14 while the jacket of the cylinder block is tapped and connected to one end of a hose 15. This latter connection represents no difficulty in the majority of automobiles for the reason that the opening to the jacket usually exists for the purpose of connecting the end of the coupling 16 which extends to the dash and is connected to the heat indicator (not shown). In the case of motor vehicles in which the water jacket is not tapped and in which it is not desired to incur this expense, the operator may provide the hose or tube 14 and instead of the hose or tube 15 may utilize a similar element 17 which has its forward end connected to the hose 12 by means of a coupling member 18. This coupling member preferably includes a thermostatic valve which will either prevent or materially impede water circulation through the radiator 11, until the temperature of the cooling water has reached a predetermined degree. Regardless of the hose 17, however, it is preferred to employ a thermostatic element which will duplicate the functions of the unit 18.

Figure 2:
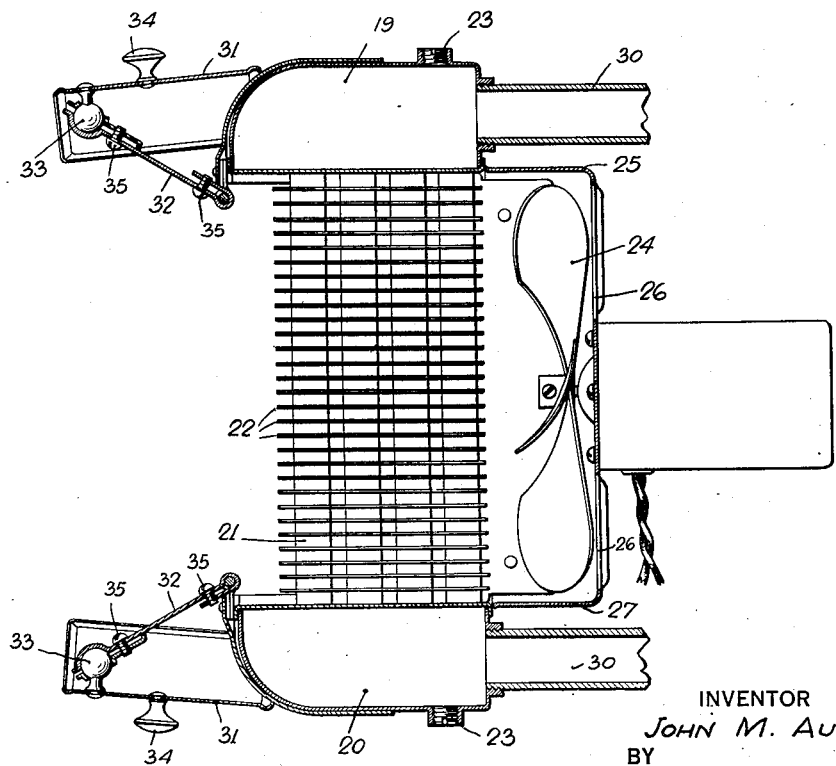
Fig. 2 is an enlarged sectional side view of the heater unit.

Now, referring to the heater per se, it will be noted, referring to Figures 2 and 3, that the same preferably includes a hollow head 19 and base 20 between which extend tubes 21 which mount fins or radiating plates 22. Both the head and base may be provided with normally sealed openings 23 so that any trapped air or sediment may be removed readily. Additionally, it will be noted that the tubes 21 are preferably flattened and extend tangentially to a medial plane so that air flowing through the heater and between the fins or plates 22 will be in contact with the latter elements and the tubes for a maximum period of time.

Now, with a view to providing means which will serve to force air through the heater unit, it is preferred to employ a motor driven fan 24. This fan, together with the motor casing, may be mounted upon a plate 25 having intake openings 26 and a forwardly extending flange portion 27, which latter overlies side walls 28, disposed adjacent the tube bank and to which side walls it is coupled as, for example, by bolts 29.

Thus, it will be seen that a readily demountable structure is provided which is compactly supported to the rear of the heater member. In turn, the entire heater may be conveniently mounted without interferring with the comfort of either passengers or driver by having the same supported by pipes 30 which extend through the front wall of the driver's compartment and are coupled at their inner ends to the hose members 14, 15, and/or 17, and have their outer ends in direct communication with the heads 19 and 20.

Of course, the motor may have a series of speeds so that different volumes of air may be passed through the interstices of the heater. In order that the air blast emanating from the space between the heads 19 and 20 may be accurately controlled, it is preferred to employ diverting plates 31 which, when the parts are in the position shown by Figure 4, merge harmoniously with the outer faces of the heads 19 and 20 and the side walls 28. These plates are, according to the present invention, coupled to levers 32 by means of ball and socket joints 33, and the inner ends of these levers are hingedly supported by the heads 19 and 20 or the surfaces extending adjacent thereto. The position of the plates may be varied by, for example, applying knobs 34 to the exterior thereof. The hinged connections at the inner ends of the rods 32, as well as the universal connections at the outer ends thereof, are preferably made in such manner that considerable resistance will be offered to movement. Consequently, the plates will remain in any position to which they have been shifted. In order to compensate for wear in this connection, it will be noted that by means of adjusting screws 35, the resistance to movement may be varied as desired. Moreover, incident to employing connections of this character, it is practicable to shift one or both plates to divert the air blast, for example, towards the driver's feet, or to have part of the blast moving in this direction while the remainder of the blast is directed toward the feet of the passenger seated beside the driver. With the parts adjusted to the position shown in Figure 2, the entire blast will simply be directed rearwardly, and with the parts adjusted to the position shown in Figure 5, the passengers will not directly receive any of the blast, but the same will be diverted downward to their feet instead. The various combinations of adjustment are manifold and will be apparent upon considering the foregoing structure. It appears unnecessary to review all of these possibilities in the present specification.

Thus, among others, the several objects of the invention as specifically aforenoted are achieved. It is obvious that numerous changes in construction and rearrangements of the parts might be resorted to without departing from the spirit of the invention as defined by the claims.

Having described my invention, what I claim as new and desire to secure by Letters Patent is:

1. A heater unit including, in combination, air heating means, means for flowing air in contact with said heating means and a plurality of movably mounted air-diverting plates positioned adjacent the delivery end of said heating means, said plates being independently movable with respect to each other in all directions.

2. A heater unit including, in combination, air heating means, means for flowing air in contact with said heating means and a plurality of movably mounted air-diverting plates positioned adjacent the delivery end of said heating means, said plates being movable independently of each other and substantially universally movable with respect to said air heating means.

3. A heater including air heating means, means for directing air into contact therewith, an air diverting plate, a strap mounted on said air heating means adjacent the outer edge thereof and adapted for movement with respect thereto, the free end of said strap comprising one-half of a ball and socket joint, while the remainder of said joint is secured to said plate whereby said plate is carried with substantially universal movement with respect to said air heating means.

4. A heater including a casing having an opening, a heating element extending within said casing and across said opening, a pair of plates for closing said opening when disposed substantially in the plane of said casing, and a pair of mounting members for said plates, said mounting members each including an arm, means for movably coupling the outer end of said arm to said plates and means for movably securing the inner ends of the respective arms to said casing and adjacent opposite edges of the opening defined therein.

5. A heater including a casing having an opening, a heating element extending within said casing and across said opening, a pair of plates for closing said opening when disposed substantially in the plane of said casing, and a pair of mounting members for said plates, said mounting members each including an arm, a ball and socket connection for coupling the outer end of the arm to the plate to be supported thereby, and means for movably securing the inner ends of the respective arms to said casing and adjacent opposite edges of the opening defined therein.

6. A heater including, in combination, a radiator, a casing formed with an opening in line with one face of said radiator, a panel for closing said opening, a rod, and connections between one end of said rod and said casing and between the opposite end of said rod and said panel, one of said connections comprising a hinge member and the other of said connections comprising a universal joint.

7. A heater including, in combination, a radiator, a casing extending adjacent said radiator and being formed with an opening in line with one face of the latter, a panel having its body transversely curved and the edges of said panel being spaced a distance substantially equal to the distance between opposite edges of said opening and means for swingingly mounting said panel whereby the latter may assume various angular positions with respect to said casing and will act as a curved deflector in cooperation with such casing.

JOHN M. AUFIERO.